F. W. SCHMIDT.
BATTERY TEMPERATURE CONTROLLER.
APPLICATION FILED JAN. 13, 1910.
976,747.
Patented Nov. 22, 1910.
2 SHEETS—SHEET 1.
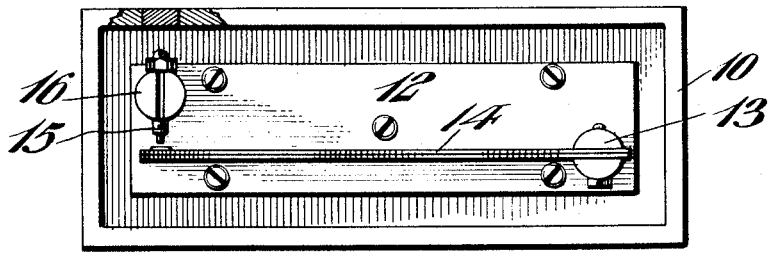
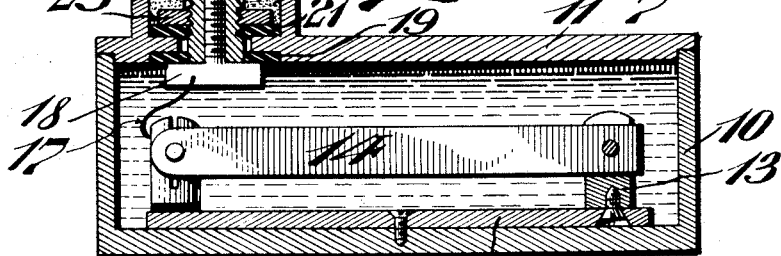
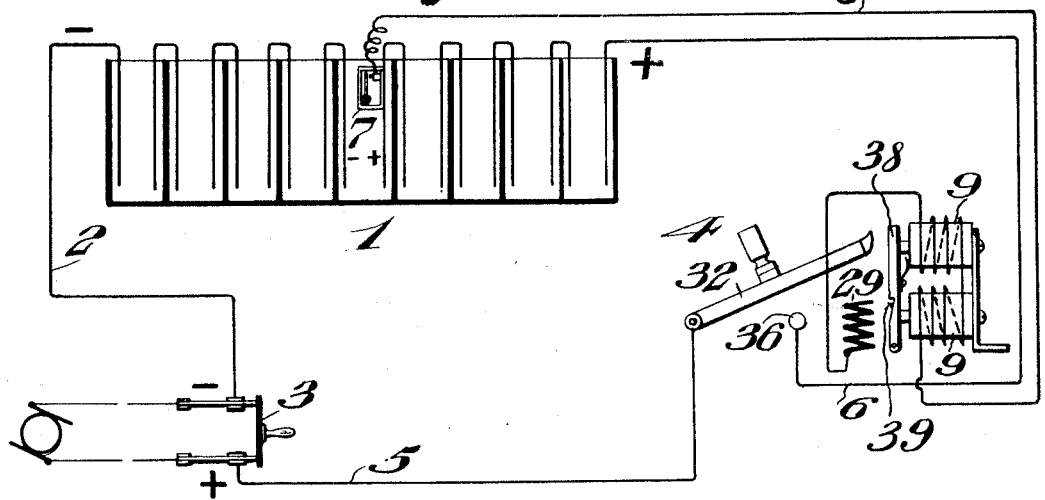
WITNESSES
INVENTOR
Frederick W. Schmidt.
BY Wiedersheim & Fairbanks.
ATTORNEYS F. W. SCHMIDT.
BATTERY TEMPERATURE CONTROLLER.
APPLICATION FILED JAN. 13, 1910.
976,747.
Patented Nov. 22, 1910.
2 SHEETS—SHEET 2.
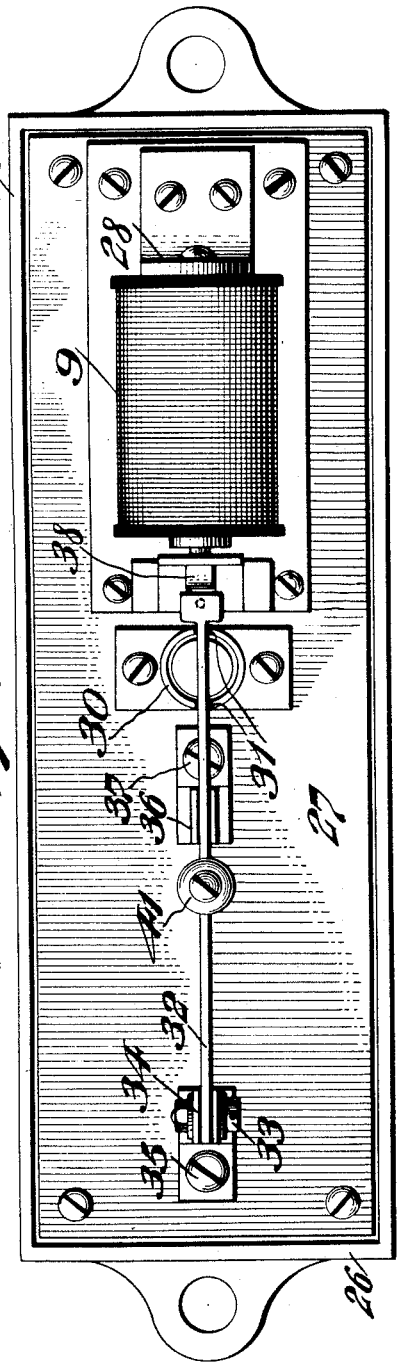
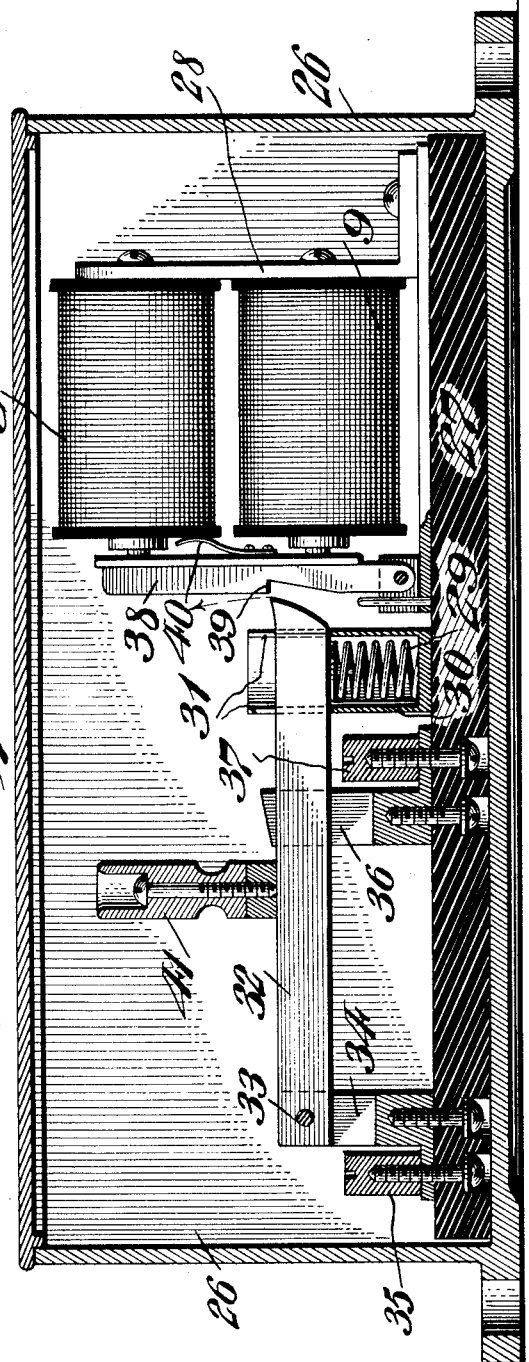
WITNESSES
H. G. Dieterich
L. Couville
INVENTOR
Frederick W. Schmidt
BY Wiedersheim & Fairbanks
ATTORNEYS

UNITED STATES PATENT OFFICE.

FREDERICK W. SCHMIDT, OF PHILADELPHIA, PENNSYLVANIA.

BATTERY TEMPERATURE-CONTROLLER.

976,747. Specification of Letters Patent. Patented Nov. 22, 1910.

Application filed January 13, 1910. Serial No. 537,803.

*To all whom it may concern:*

Be it known that I, FREDERICK W. SCHMIDT, a citizen of the United States, residing in the city and county of Philadelphia, State of Pennsylvania, have invented a new and useful Battery Temperature-Controller, of which the following is a specification.

My invention relates to a new and useful improvement in a device for controlling current during the charging of a storage battery whereby I provide means for opening the circuit and discontinuing the further charge, when the temperature in the storage battery has reached a predetermined point.

It further consists in providing an automatic switch in the main or charging circuit and in connecting the magnets of the switch with an auxiliary circuit which is connected with a thermostat contained in the storage battery.

It further consists of novel means for accomplishing the desired result all as will be hereinafter set forth.

The annexed drawings and the following description set forth in detail, one mechanical form embodying the invention; such detail construction being but one of various mechanical forms in which the principle of the invention may be used. Other modes of applying such principle may be employed and changes may be made, provided the principles of construction set forth respectively in the following claim are employed.

Figure 1 represents a plan view, with the cover removed of a thermostat employed. Fig. 2 represents a vertical sectional elevation thereof. Fig. 3 represents a diagrammatic view showing both circuits, that is, the main and auxiliary circuits with the thermostat and the automatic switch open. Fig. 4 represents a plan view of the circuit breaker. Fig. 5 represents a vertical sectional view thereof.

In the present charging of electric storage batteries I have found that the heat generated in charging the same is so great as to burn out the battery, since the elements composing the battery are often destroyed rendering the battery unfit for further use and entailing great expense and loss.

Referring first to Fig. 3, which is a diagrammatic view, it will be understood that 1 designates the storage battery carried by a vehicle or other suitable device and to one end of said storage battery is connected a conductor 2 which leads to the socket or switch 3 adapted to receive the plug or other suitable means for connecting the said socket and its conductors to a dynamo or other suitable source of electric supply.

4 designates an automatic switch which I desire to employ and which is connected with the socket by a conductor 5 and is connected with the opposite end of the storage battery from that with which the conductor 2 is connected, by a conductor 6 whereby it will be understood that the storage battery and the automatic switch will be in the main or charging circuit.

7 designates the thermostat employed which is situated or carried directly in the storage battery and which has a conductor 8 leading therefrom which surrounds the magnets 9 in the automatic switch said conductor being suitably connected with the automatic switch as will be hereinafter described, in order to form a branch, shunt or auxiliary circuit between the thermostat and the magnets of the automatic switch.

It will be understood that current from the supply will pass through the main circuit and charge the battery but should the temperature or heat in the battery due to this charge be raised beyond the safety limit or to a desired point, the thermostat will be caused to close the auxiliary circuit and so energize the magnets as to operate the switch to open or break the main circuit and also the auxiliary circuit so that no further charging can take place. In other words, I have provided means automatically operated to open the circuit of the main current supply at a predetermined temperature or a desired temperature in the storage battery in order to prevent injury to the storage battery and I desire further to call attention to the fact that no further charge can take place until the temperature has fallen below the said predetermined point.

Referring now to the thermostat it will be seen that I have provided a casing 10 which is preferably formed of an acid resisting material, as for example, lead, said casing being provided with a lid 11 which tightly closes the same and it being understood that within the casing I place an insulating liquid, such as transformer oil in order to protect the parts therein and act as a conductor of heat in order to assist in the actuation of the thermostat and prevent the formation of an arc between the points. By reason of th metal such as lead composing the receptacle the same will form one pole of the auxiliary circuit by reason of its contact with one of the elements of the storage battery. Suitably connected with the bottom of the receptacle 10 is a brass plate 12 which carries a post 13 to which is connected, in any suitable manner, a bar or arm 14 which is preferably composed of brass and steel suitably secured or riveted together in order that the same will be bent or bowed when subjected to heat. Adjustably supported within the casing is the contact piece 15, which, in the present instance, I have shown formed of a screw and which is suitably situated adjacent the free end of the arm 14 in order that as the arm bends or bows, due to the heat, a suitable portion of the arm will contact with the said piece 15 at a predetermined temperature. The contact piece 15 in the present instance, is carried by the post 16 which is insulated from the brass plate 12 and is in turn connected by the conductor 17 with a binding screw 18, which is preferably of brass and which is insulated from the lid or cover 11 of the casing by insulation 19, said screw being protected by a cap 20 formed of lead or any other acid resisting material whereby said screw will not be subjected to the acid, it being understood that the said lead is suitably insulated from the cover 11, in the present instance, by means of insulation 21 and further insulation 22 and said cap 20 being in threaded engagement with the brass nut 23 for holding the parts in position while the said cap is further engaged by a nut 24 formed of lead having a brass nut 25 therein for engagement with the cap 20 whereby it will be understood that the cap is preferably insulated from the box itself and has the conductor 8 suitably connected therewith.

Referring now to the automatic switch, I have shown one form in Figs. 4 and 5 which operates successfully and in which I provide a casing 26 in which is mounted a slate base 27 which carries the mechanism of the automatic switch.

28 designates a support which carries the magnets 9 of the switch around which it will be understood is wound or coiled the conductor 8, the end of said conductor being brought into suitable contact or connection with a spring 29, which is suitably supported adjacent the magnets 9, in the present instance, in the tube 30, the upper portion of which is slotted at 31 and is adapted to receive a suitable portion of the knife blade 32 which is pivoted at 33 to a suitable support 34 which is in contact with the conductor 5 through the binding post 35.

36 designates blades with which the knife blade 32 is adapted to contact, said blades 36 being in suitable contact with the conductor 6 by means of the binding post 37 whereby it will be understood that the knife blade 32 when in contact with the blades 36 closes the main or charging circuit in which the storage battery is situated as well as the automatic switch 4. The spring 29 is adapted to bear against a suitable point of the knife blade 32 which tends to throw the knife blade upwardly and remove the same from contact with the blades 36, it being understood that by reason of the conductor 8 being in contact with the spring 29 an auxiliary circuit is formed between the automatic switch and the thermostat which is not closed until the arm of the thermostat contacts with the contact piece 15.

38 designates the armature for the magnets 9 which is pivotally supported adjacent the same and which is provided with a shoulder or notch 39 adapted to be engaged by the end of the knife bar 32 in order to hold the same in normal position and so in contact with the blades 36 in order to maintain the main or charging circuit closed.

40 designates a spring bearing on the armature 38 and tending to normally hold and return the same in position to cause the shoulder 39 to be in engagement with the knife blade 32 and said spring will return the armature to the proper position after the latter has been attracted by the magnets 9 and the current ceases flowing therethrough. On the knife blade I provide a handle 41 which is adapted to be grasped by the operator in order to return the knife blade 32 to its normal position after it has been released and elevated.

The operation of the device is as follows:—After the socket has been suitably connected with the current supply it will be understood that the knife blade 32 is in engagement with the blades 36 and the current or circuit is thus closed and will flow through the conductor 2, conductor 5, knife blade 32, conductor 6 through the storage battery and the latter will thus receive the charge, it being understood that the arm 14 is out of engagement with the contact piece 15 and therefore the auxiliary circuit is opened. Should it happen during the charging, that the temperature in the battery rises to a predetermined height, say 105°, the arm 14 will be bent or bowed causing the end thereof to contact with the piece 15 immediately upon which the auxiliary circuit will be closed and the magnets 9 energized attracting the armature 38 overcoming the tension of the spring 40 and moving the armature and thus the shoulder 39 out of engagement with the end of the knife blade 32, whereupon the spring 29 acts to throw up the said knife blade 32 and removes the same from contact with the blades 36 and the main or charging circuit is thus opened and further charging ceases and at the same time the auxiliary circuit is also opened as will be evident.

When the heat in the battery falls below the predetermined point the arm 14 is removed from contact with the piece 15 and the operator by moving down the knife blade 32 will cause the end thereof to be again engaged by the shoulder 39 since the armature has been returned to its proper position for this purpose and the main circuit will again be closed and the current can again flow to the storage battery. At the same time the auxiliary circuit will be closed excepting at the thermostat and will be ready to operate when the temperature again rises in the storage battery.

Positive action of the cutting-out device is insured by locating the thermostat within the battery and immersed in the battery fluid, so that only changes in the temperature of such fluid and of the elements therein will actuate the device, and so that influences of temperature external to the battery will have no influence upon the operation of the device. This feature is of particular importance and advantage when charging the batteries out of doors and in cold weather, when a thermostat-device located outside of the battery might not act until long after the interior temperature of the fluid and elements has risen far beyond the predetermined point or danger point.

By reason of one of the members of the thermostat (in the present instance, the bar or strip) being in electrical contact with the metal of the inclosing casing, the thermostat forms one terminal of the auxiliary circuit when contact is closed by such bar, and forms an element within the battery circuit, being immersed in the battery solution, in contact or out of contact with an element of the battery.

Having thus described my invention, what I claim as new and desire to secure by Letters Patent, is:—

In a device of the character stated, a charging circuit, a storage battery in such circuit, a branch circuit having one terminal connected to a terminal of the charging circuit, a thermostat immersed in the battery solution and having one contact member connected to one terminal of the branch circuit and the other contact member in contact with a metallic element in the solution, an automatically opening circuit breaker between terminals of the charging circuit and one terminal of the branch circuit, and an electro-magnetic releasing device for such circuit-breaker and wound in the branch circuit.

FREDERICK W. SCHMIDT.

Witnesses:
  C. D. McVay,
  M. E. Rinkenbach.